United States Patent [19]

Baldus et al.

[11] Patent Number: 5,968,859
[45] Date of Patent: *Oct. 19, 1999

[54] CERAMIC FIBERS IN THE SYSTEM SILICON-BORON-NITROGEN-CARBON

[75] Inventors: Hans-Peter Baldus; Nils Perchenek, both of Leverkusen; Axel Thierauf, Würzburg; Ralf Herborn, Würzburg; Dieter Sporn, Würzburg, all of Germany

[73] Assignee: Bayer Aktiengesellschaft, Germany

[ * ] Notice: This patent is subject to a terminal disclaimer.

[21] Appl. No.: 09/133,125

[22] Filed: Aug. 12, 1998

Related U.S. Application Data

[63] Continuation of application No. 08/907,258, Aug. 6, 1997, Pat. No. 5,834,388, which is a continuation of application No. 08/693,613, Aug. 7, 1996, abandoned.

[30] Foreign Application Priority Data

Aug. 18, 1995 [DE] Germany .......................... 195 30 404

[51] Int. Cl.$^6$ ....................................................... C04B 35/58
[52] U.S. Cl. .......................... 501/95.1; 501/92; 501/96.2
[58] Field of Search ............................ 501/92, 95.1, 96.2

[56] References Cited

U.S. PATENT DOCUMENTS

| 5,128,286 | 7/1992 | Funayama et al. | 501/97 |
| 5,436,398 | 7/1995 | Shimizu et al. | 525/475 |
| 5,543,485 | 8/1996 | Baldus | 501/97 |

*Primary Examiner*—Karl Group
*Attorney, Agent, or Firm*—Connolly & Hutz

[57] ABSTRACT

The invention relates to new amorphous, high-strength SiBN(C) fibers which are at the same time resistant to high-temperature creep, their production and use. The fibers have a strength at room temperature of >2.5 GPa, a modulus of elasticity of >250 GPa and a creep value m of from 0.4 to 1 (in accordance with standard BSR test, 1 hour, 1400° C.).

1 Claim, 2 Drawing Sheets

CERAMIC FIBERS IN THE SYSTEM SILICON-BORON-NITROGEN-CARBON

CROSS-REFERENCE TO RELATED APPLICATIONS

The present application is a continuation of application Ser. No. 08/907,258 filed Aug. 6, 1997, now U.S. Pat. No. 5,834,388, granted Nov. 10, 1998, which is in turn a continuation of application Ser. No. 08/693,613, filed Aug. 7, 1996, now abandoned.

The invention relates to new amorphous, high-strength SiBN(C) fibres which are at the same time resistant to high-temperature creep, their production and use.

Materials having high damage tolerance and strength as well as excellent creep resistance at elevated temperatures (>1300° C.) are required for the development of improved gas turbines. Ceramic fibre/ceramic matrix composites (CMC materials) are of particular interest for this.

The CMC materials hitherto available still show, however, inadequate long-term stabilities for application in turbines and are useable only up to temperatures of about 1100° C.

The main cause of the lack of efficiency of the current CMC materials is the inadequate thermal and chemical resistance of the available reinforcing fibres, the maximum operating temperature whereof is about 1200° C. Above this temperature structural alterations (crystal growth) occur in the fibre, or time-dependent breakdown mechanisms appear, such as subcritical crack growth or damage due to creep, which lead to high degradation in the fibre properties and consequently to an unacceptably short useful life of the composite. A further negative property of many types of fibres is their tendency to creep at elevated temperatures. Creep leads to an increasing load on the matrix and can consequently also entail a time-dependent breakdown of the composite. In non-oxide fibres the fibre properties moreover gradually deteriorate through oxidation or corrosion.

Commercially available amorphous to partly crystalline Si(CO) fibres based on polycarbosilane (U.S. Pat. Nos. 3,529,044; 4,117,057; 4,158,687; EP-A 435 065; 438 117) are usable up to 1000° C. at most. This is due mainly to the high proportion of $O_2$ in the fibres (about 12%), which at elevated temperatures leads to the formation of a glass phase of low viscosity, which accelerates the oxidation of the SiC material and is responsible for the high creep rate of the material. Another effect of the high proportion of oxygen is a SiC crystal growth which already commences at temperatures below 1100° C. and leads to structural failures and a dramatic loss of strength.

New developments in non-oxide reinforcing fibres such as partly crystalline SiC fibres containing a small excess of carbon (U.S. Pat. No. 4,942,011) or stoichiometric SiC fibres containing nanocrystalline (U.S. Pat. No. 5,366,943) or microcrystalline (U.S. Pat. No. 5,354,527) structures are said to show more favourable properties and also to be useable long-term at temperatures of up to about 1300° C. This is attributed primarily to their low residual oxygen content of 0.5 wt. % $O_2$. The fibres are obtained by pyrolysis of melt-spun polycarbosilanes or are produced from a mixture of SiC powder and organic binder.

The fibres have a high modulus of elasticity of between 280 GPa (partly crystalline fibres) and >400 GPa (stoichiometric SiC fibres). As expected, they show an oxidation behaviour resembling that of monolithic, sintered Sic. The nanocrystalline fibres produced from polycarbosilane precursors show very satisfactory strengths, of about 3 GPa, at room temperature, but their creep strength at temperatures exceeding 1200° C. is inadequate for their use in gas turbines. The fibre produced from silicon carbide powder, on the other hand, appears to have very satisfactory creep properties at above 1300° C. However, owing to its exceptionally coarse microstructure (1 to 2 μm particle diameter), it possesses only a comparatively low tensile strength not exceeding 1.5 GPa.

The fact that the fibres having a nanocrystalline structure, despite a low residual oxygen content, show a distinctly worse behaviour as regards creep in comparison with microcrystalline SiC fibres, clearly demonstrates that in the polycrystalline, covalent non-oxide fibres coble creep takes place, dependent on the composition of the boundary phase, which limits the maximum temperature at which the fibre can be used. Ultimately this means that the maximum temperature at which the known SiC fibres can be used is determined by their particle size. The minimum strength of about 2 GPa required for reinforcing fibres is however according to present experience only achieved when the SiC crystallites in the fibre are smaller than 0.5 μm. This means that at present there exists no ceramic SiC fibre is known, which simultaneously satisfies both the criterion of creep resistance at temperatures of above 1300° C. and the criterion of a minimum strength of 2.0 GPa.

Non-oxide fibres based on $Si_3N_4$ are found in U.S. Pat. No. 4,397,828. The $Si_3N_4$ fibre can be used at up to 1200° C.; its strength is given as 2.2 GPa and the modulus of elasticity as 200 GPa. No data on creep resistance is given. Owing to the partly crystalline to nanocrystalline structure of this fibre, to the low modulus of elasticity and the oxygen content of about 3 wt. %, a distinctly worse creep resistance as compared with oxygen-free SiC fibres is to be expected.

U.S. Pat. No. 5,128,286 discloses SiBN(C)(O) fibres having slightly poorer strengths and moduli of elasticity as compared with $Si_3N_4$ fibres. These fibres remain amorphous up to 1750° C. No data on creep resistance is given. However, the relatively high $O_2$ contents (about 7 wt. %) and the low moduli of elasticity (<250 GPa) are indicative of a low strength and creep resistance in these fibres at elevated temperatures. Other methods of producing SiBNC(O) fibres are disclosed in U.S. Pat. Nos. 4,604,367 and 4,550,151.

Polymeric precursors for the production of silicon nitride, silicon carbonitride and silicon carbide are described in U.S. Pat. Nos. 4,310,751; 4,312,970; 4,650,837; 4,639,501; 4,720,532. The production of polyborosilazanes and ceramic materials therefrom is found in EP-A 389 084, 549 225, 536 698, 404 503, 424 082 as well as DE-OS 43 20 782 and 43 20 783.

DE-OS 41 07 108 and EP-A 659 806 disclose fusible and soluble polyborosilazanes, which are prepared by the ammonolysis of the molecular one-component precursors $Cl_3Si$—NH—$BCl_2$ (TADB) and $(Cl_3Si$—$NH)_2$—BCl (TACB) respectively. The ceramic materials obtained from these polymers by pyrolysis are distinguished by having excellent resistance to oxidation and by maintaining the amorphous state up to at least 1800° C. (atmosphere $N_2$, residence time 6 h).

The prior art regarding the production of ceramic continuous fibres from polymeric precursors involves the multifilament spinning from fusible and soluble precursors, which is described, for example, in DE-OS 43 20 782 and 43 20 783. Here the extrusion technique known from the conventional spinning technology is applied for the build-up of pressure against the die base. This extrusion technique has the disadvantage that problems involving consistency of texture when operating the screw at elevated temperatures render more difficult the exclusion of atmospheric moisture or oxygen. This also leads to a loss of solvent from the polymer, which results in an alteration in the flow and hence in the spinnability. Moreover, for melt-spinnable fibres curing by oxygen is prior art.

The complete process of producing the fibre, that is, spinning, drying, curing the green fibre as well as pyrolysis and sintering completely in specified atmospheres, has not hitherto been successfully carried out.

Amorphous ceramic SiBN(C) fibres having a strength at room temperature of >2.5 GPa, a modulus of elasticity of >250 GPa and a creep value m of from 0.4 to 1 (in accordance with standard BSR test, 1 hour, 1400° C.) have now been successfully produced. The fibres preferably have an oxygen content of from 0.001 to 1.5 wt. %.

The fibres according to the invention remain in the amorphous state up to at least 1800° C. under inert gas and are stable in air up to at least 1400° C., preferably up to at least 1500° C. Their strength at room temperature is >2.5 GPa. It is preferably 2.5 to 4.5 GPa, particularly preferably 3.0 to 4.5 GPa. The strength at 1400° C. is >1.5 GPa, preferably 1.5 to 3.5 GPa, particularly preferably 2.1 to 3.0 GPa (see Table 1).

TABLE 1

Strength of SiBN(C) fibres according to the invention after exposure to air (average values)

| Exposure time [h] | Temperature [° C.] | | | | |
|---|---|---|---|---|---|
| | 20 | 1000 | 1200 | 1400 | 1500 |
| 0 | 3.5 GPa | | | | |
| 10 | | 3.0 GPa | 3.2 GPa | 3.1 GPa | 3.0 GPa |
| 20 | | 3.0 GPa | 3.0 GPa | 2.9 GPa | 2.9 GPa |
| 30 | | 3.0 GPa | 2.9 GPa | 2.7 GPa | 2.9 GPa |
| 40 | | 2.9 GPa | 2.8 GPa | 2.8 GPa | 2.6 GPa |
| 50 | | 2.9 GPa | 2.8 GPa | 2.7 GPa | 2.5 GPa |

The moduli of elasticity of the fibres according to the invention are >250 GPa at room temperature. They are preferably from 250 to 450 GPa, particularly preferably from 350 to 450 GPa. At 1400° C. they are preferably from 200 to 300 GPa.

Figure 1:
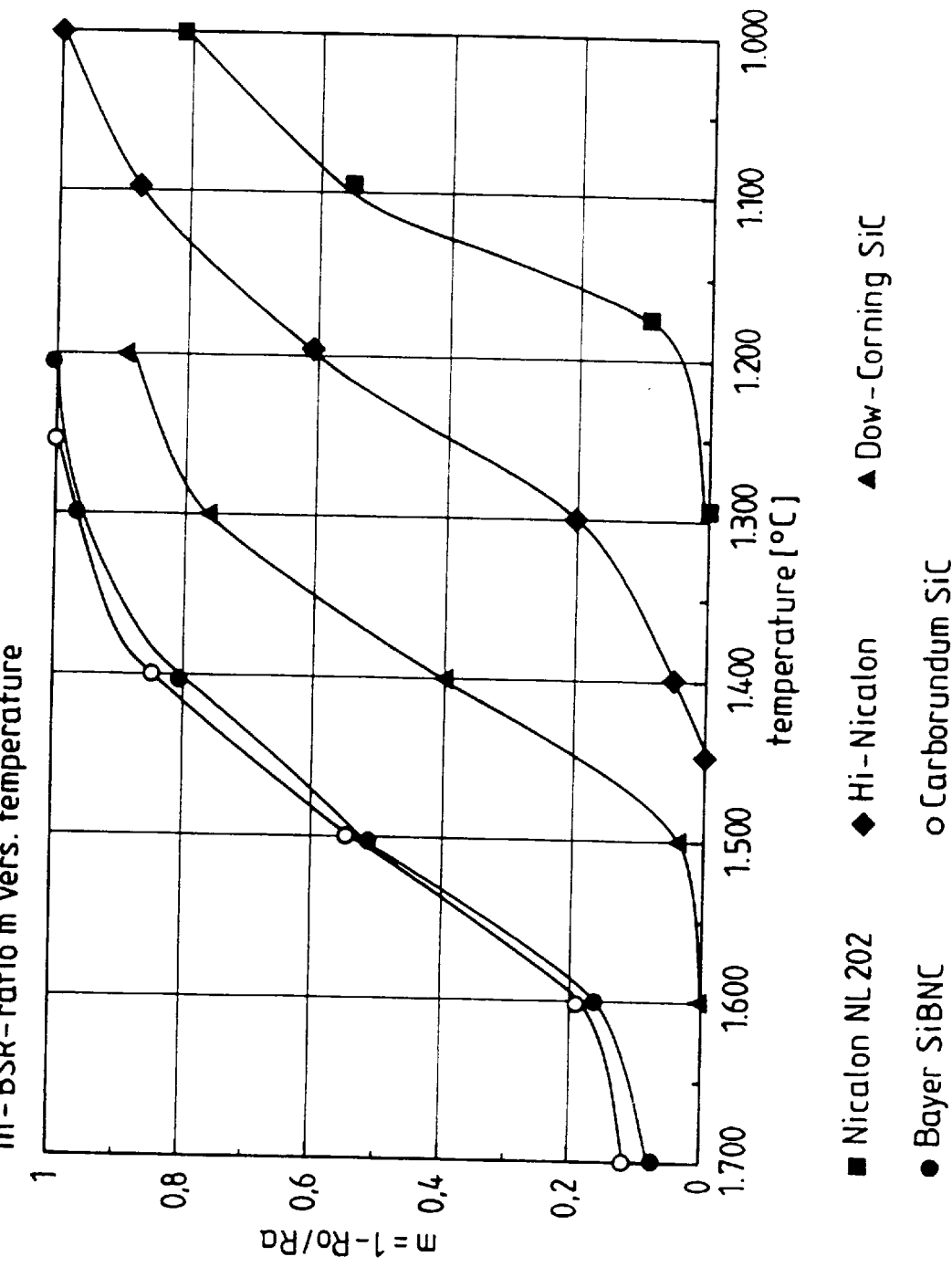
FIG. 1 is a graph illustrating the temperature dependence of the creep value m for various types of ceramic fibers.

The standard creep test by the method of DiCarlo et al. (Bend Stress Relaxation Test, DiCarlo et al., Proceedings of 3rd. NASA HITEMP Review, October 1990, pp. 49-1 to 49-8) was performed in order to determine the creep resistance at temperatures >1300° C. The creep value m may assume values of between 0 and 1. The greater the value, the better is the creep resistance. The creep value m should exceed the value 0.4 at the temperature at which a long-term use is intended. The fibre according to the invention possesses a creep value (m value) of greater than 0.4 according to the standard BSR test in air at 1400° C. This is totally unexpected on the basis of the current knowledge regarding the mechanics of amorphous and partly crystalline and nanocrystalline fibres at elevated temperatures. Partly crystalline SiC fibres which are low in oxygen (<1 wt. % $O_2$) (Hi-Nicalon, Nippon Carbon) show m values of 0, for example, in the standard BSR test (1 hour, 1400° C.); the nanocrystalline (<0.5 wt. % $O_2$) SiC fibres (Dow Corning) show an m value of 0.35. All hitherto known non-oxide fibres having oxygen contents of >2 wt. %, even after an exposure at a temperature of about 1200° C., show an m value of 0. FIG. 1 shows m values for different types of fibre at temperatures of between 1000 and 1700° C.

The SiBN(C) fibres according to the invention can be produced from polyborosilazanes having the following proportions of elements:

N/Si: 0.5 to 4; B/Si: 0.1 to 1; O/Si: 0.0001 to 0.1; C/Si: 0.0001 to 1.3; H/Si: 0.001 to 20.

The pyrolysate of the polyborosilazanes according to the invention is to be amorphous at pyrolysis temperatures up to 1600° C. and is to contain no crystalline deposits of boron nitride, silicon nitride, silicon carbide or boron carbide. Under conditions of use, the amorphous structure of the material must be maintained at temperatures of >1300° C. for at least 1000 hours.

A crystallisation of the amorphous fibre leads to particle growth, which results in a distinct deterioration in the strength, as well as to a decrease in the creep resistance owing to grain-boundary creep (Coble creep).

The fibres according to the invention are preferably produced from polyborosilazanes having an oxygen content of from 0.001 to 1.5 wt. %, as a lower oxygen content in the polymer has a favourable effect on the properties of the fibres obtained. Oxygen contents of above 1.5 wt. % in the fibre cause premature crystallisation owing to liquid phase diffusion through the low-viscosity glass phase which forms from 1000° C. Both the low-viscosity glass phase and the crystallisation in turn increase the creep rate and cause losses in strength.

It is advantageous in a melt-spinning process if the polyborosilazanes used have a melting point of between 80 and 250° C. and are stable in storage over a prolonged period, that is, at least 6 months.

The polyborosilazanes disclosed in DE-A 41 07 108 and EP-A 659 806 are particularly suitable for the production of the fibres according to the invention.

In addition to suitable polymeric and ceramic materials, however, the appropriate spinning and pyrolysis technology is required for the production of a high-strength ceramic fibre low in oxygen.

The invention therefore also provides a method for the production of the fibres according to the invention, wherein preceramic polyborosilazanes are transformed by dry spinning or melt spinning into green fibres and these are subsequently dried, rendered infusible and pyrolysed.

Figure 2:
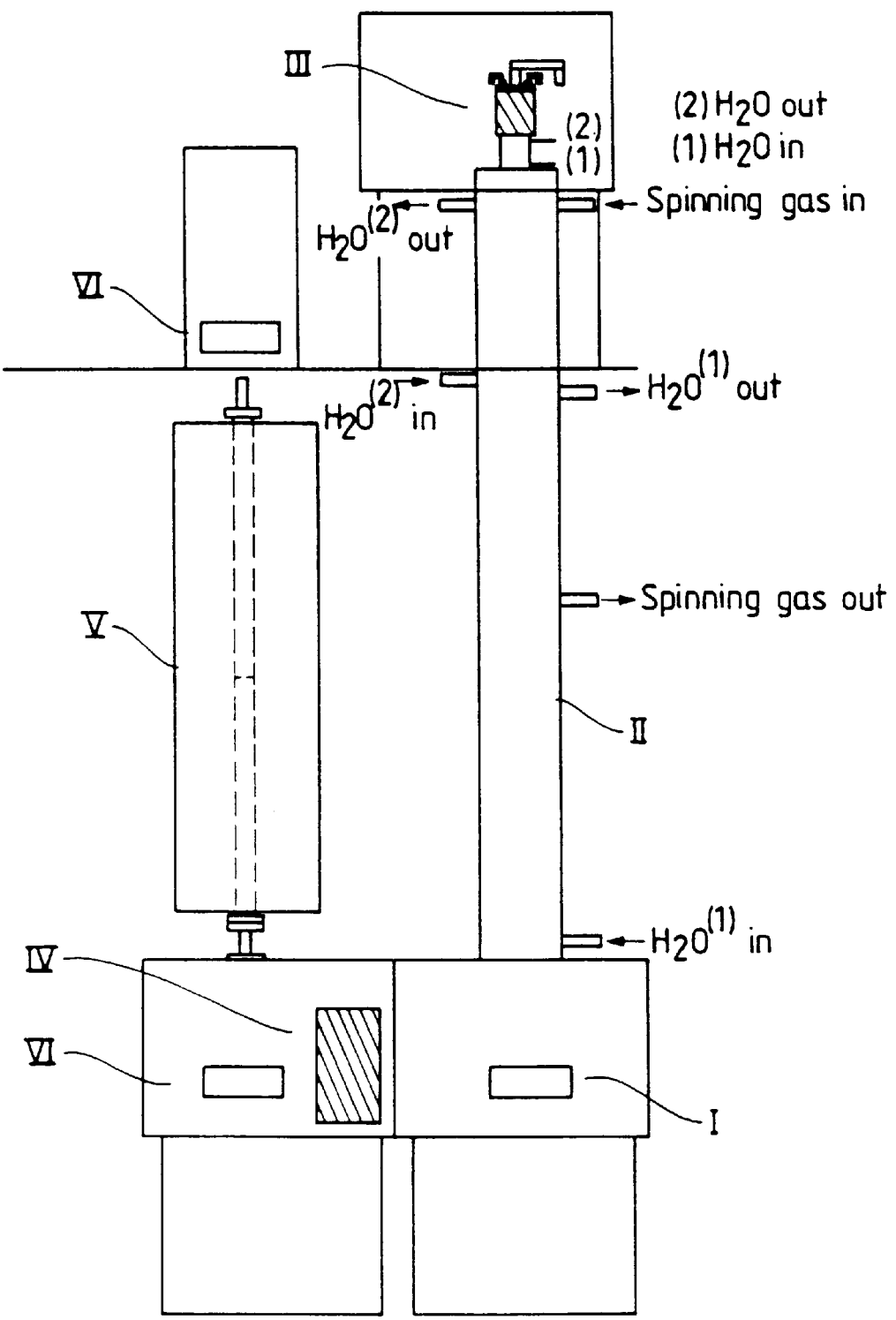
FIG. 2 is a schematic illustration of a fiber spinning unit, according to the present invention.

According to the invention, continuous fibres must be spun from atmospherically sensitive precursors in controlled inert ($N_2$, Ar, He etc.) or reactive atmospheres (for example, $NH_3$, amines, boranes, silanes). The green fibres thus produced must then be cured in a controlled atmosphere and pyrolysed. The intermediate steps of handling and storage of the fibres must take place in a controlled atmosphere. This is best achieved when all the processing steps can be carried out in one single unit. A unit of this kind is reproduced schematically in FIG. 2.

The unit is constructed from the following components:
1. A first box, constructed from glove boxes (MB 150B-G-1, M. Braun GmbH, D-85748 Garching) and supplied with solvent filter, pairs of gloves, analysers for oxygen and water.

2. An integrated cross-winding head (I), controlled by thread tension or having continuously adjustable winding up rate and continuously adjustable cross-winding rate, comprising a rotary current motor and a drawing cylinder.
3. A drying tower spinning tube (II) equipped with a spinning gas recirculation system, comprising a thermally insulated tube having a double casing, which tube can be heated or cooled in three zones within the temperature range from −70° C. to +250° C., and thermostats. The tube is sealed by means of PTFE seals from the glove box and gas lock. Internally there are spinning gas recirculation devices, which render possible a directed flow of the fibres in and towards the direction of drawing, with specific atmospheres for the curing of the fibres.
4. A second box, constructed from glove boxes (Labmaster, M. Braun GmbH, D-85748 Garching), as a gas lock for gastight coupling of the spinning head to the spinning unit and also as a storage space for the polymer. The gas lock is so constructed that a return flow of the spinning gas is avoided. The gas lock is water-cooled in order to achieve the separate cooling of drying tube and spinning head.
5. An inertised spinning head (III) for the polymer being spun, constructed either as a pressure unit or as an extruder unit, comprising a nozzle head, quick-connect couplings for the cooling and heating media respectively, a quick-connect coupling for the gas atmosphere and a temperature sensor for the thermostatic control.
6. An inertised gas reactor (IV) for the subsequent cross-linking of the polyborosilazane, comprising a glass reactor having gastight inlets and outlets for heat-exchanging oil and ammonia, silanes, boranes, amines and other gases suitable for curing the fibres.
7. An inertised fibre pyrolysis furnace (V), controlled by thread tension, constructed in the form of a silit furnace with four or more heating zones having a total length of 2000 mm. The furnace is provided on the outlet side with gas locks for the pyrolysis gases. For the purpose of inerting, the furnace is double-walled and equipped with separate flushing for the walls. The fibres are transported through the furnace by winders controlled by tensile force (VI).

The fibres according to the invention are produced under inert conditions, that is, with of residual oxygen content of <2 ppm and residual water content of <0,1 ppm. The production proceeds according to the following steps:

1. The polyborosilazane spinning material is packed into the storage vessel, with air and moisture being excluded. The vessel comprises a double-walled, pressure vessel the temperature whereof is controllable, provided with quick-connect couplings for the supply of the heating medium, for example, heat-exchanging oil. Temperatures can be adjusted within the range of −70 to +300° C. The preferred spinning temperatures during the spinning of the polyborosilazane are from 60 to 250° C.
   The gas or extruder pressures applied during spinning of the fibres are between 0.1 and 15 MPa. On the side towards the unit, the pressure vessel is provided with a multiple nozzle head for spinning single and multiple filaments, at the end of which a temperature sensor is attached. After disconnecting the materials being supplied it is possible to transfer the pressure vessel into the interior of the inert spinning unit and in a controlled atmosphere to fill it with the material being spun. After it has been filled, the gastight pressure vessel is mounted on the drying tube above the gas lock.
2. The nozzle head is coupled to the inert spinning plant, with air and moisture being excluded. This is effected via an adapter piece specifically designed for this purpose, a gas lock having an integrated annular nozzle for the spinning gas on the side towards the spinning plant and a bayonet closure on the side towards the pressure vessel.
3. The fibre spinning process is initiated by applying an excess pressure supplied by the desired atmosphere, for example, an $N_2/NH_3$ mixture, and adjusting the intended temperature in the spinning head.
4. The fibres are spun or drawn in a controlled atmosphere and under controlled thermal conditions. The drawing or spinning of the fibres in the thermally controlled drying tube is assisted by a directed flow of spinning gas. The spinning gas is partially returned via a diaphragm pump. In the drying tube the fibres are set under tensile stress in a controlled atmosphere. This results in stretching of the green fibres with stretch ratios of 10 to 100. As a consequence, uniaxial alignment of the Si—N—B bonds in the otherwise amorphous fibres is observed (bonding texture). The increase in strength is more than proportional to the reduction in fibre diameter and comparable to bonding texture observed in high strength polymer fibres. The cross-winding head then winds the fibres in multiple layers on drawing cylinders of different diameters. The drawing rates are from 0 to 600 m/min. The drawing cylinders may consist, for example, of graphite. The polyborosilazane green fibres can be spun at spinning rates of from 10 to 1000 m/min. At the same time, hot reactive gas or inert gas (for example, $NH_3$, $N_2$) is usefully blown onto the fibres, in order to assist subsequent curing.
5. The polyborosilazane green fibres produced are subsequently treated in a controlled atmosphere. This can be carried out, for example, using $N_2$, $NH_3$, or oxygen-free compounds capable of undergoing a cross-linking reaction with NH groups. These include, for example, compounds such as hydrazine, or those having at least one Si—H bond or B—H bond. Here gaseous boranes, low-boiling borane adducts and volatile silanes are particularly preferred. Mixtures of these components may also be used.

The subsequent curing of the green fibres, if not already completed in situ in the drying tube, is carried out in an integrated, thermostatically controllable glass reactor. The supply and withdrawal of the heat-exchanging medium and of the reactive and inert gases is carried out via VA steel ducts. For the filling and emptying of the reactor with fibres to be cured or nongaseous curing agents, the internal volume of the reactor can be flushed with inert gas, so that no reactive medium (gas) enters the internal space of the inert spinning unit. The curing of the green fibres made from polyborosilazane is carried out at a temperature of from 20° C. to 300° C., depending on the curing agent used. The subsequent curing time is between 2 seconds and 100 hours, depending on the curing agent.
6. The green fibres are pyrolysed and sintered in a controlled atmosphere, for example, in mixtures of $N_2$ and $NH_3$ in the ratio of from 1:10 to 100:1.

A special furnace unit having four heating zones which can be operated under inert gas was developed for the continuous pyrolysis, controlled by thread tension, of the green fibres. The fibres, controlled by thread tension, are pyrolysed in the furnace unit at a specified forward movement rate of from 1 to 600 m/h. Between 20 and 2000 filaments simultaneously can be continuously pyrolysed. The pyrolysis temperature is from 1200 to 1800° C.

The multifilaments are subsequently sized using conventional sizing agents for the purpose of better handling and are wound up on a roll.

The invention also provides the use of the fibres according to the invention as reinforcing fibres in metallic or ceramic structural parts. To this end the fibres are introduced into the structural parts in a manner known to the person skilled in the art.

Owing to their stability at elevated temperatures and their low susceptibility to oxidation or chemical attack, the fibres according to the invention can also be used as high temperature filter materials.

EXAMPLES

Example 1

Preparation of polymer 1000 ml of methylamine is condensed at −78° C. in an evacuated 5000 ml three-necked flask equipped with a 5000 ml dropping funnel and without a pressure-compensating tube. A solution of 300 g of $Cl_3Si$—NH—$BCl_2$ in 2500 ml of petroleum ether is then added with vigorous stirring in such a manner that the internal temperature does not rise above 0° C. The solid, which consists substantially of methylamine hydrochloride, is filtered off through a reverse frit. The solvent is distilled off from the clear petroleum ether solution under reduced pressure. A colourless, highly viscous oil remains behind (250 g).

The oil is then thermally cured at 240° C. for a period of 10 minutes to form a solid polyborosilazane. The polymer has a melting point of 200° C. Composition in wt. %: Si: 18.0; B: 7.5; N: 37.4; H: 8.1; C: 28.1; O: 0.4

Example 2

Production of the green fibre

Fibres are spun from the polymer prepared as in Example 1. During the spinning process the viscosity of the polymer is about 2 Pas. 100 filaments are spun simultaneously. During the spinning process hot nitrogen is blown onto the fibre in the drying tower to achieve further curing. The spinning conditions are listed in Table 2.

TABLE 2

Spinning conditions for the polymer from Example 1

| Spinning temperature | Spinning pressure | Drawing rate | Diameter of fibre |
|---|---|---|---|
| 175° C. | 5.0 MPa | 5–20 m/min | ca. 50–100 µm |
| 180° C. | 1.0–4.0 MPa | 5–200 m/min | ca. 5–70 µm |
| 185° C. | 0.5–3.0 MPa | 5–50 m/min | ca. 5–50 µm |
| 190° C. | 0.5–1.0 MPa | 5–10 m/min | ca. 5–40 µm |

The optimised range of conditions for spinning the polymer from Example 1 are a nozzle temperature of 180° C. and a spinning pressure of 2 MPa. At a drawing rate of 200 m/min, the diameter of the fibres is then about 20 µm in the non-pyrolysed fibre (gel fibre) and about 12 µm in the fibre pyrolysed at 1450° C. Fibres having lengths of between 40 km and 100 km are drawn continuously. No variation in the fibre diameter is observed during the spinning process when conditions are maintained constant. The fibres melt at about 210° C.

Example 3

Production of green fibre

In a manner similar to Example 2, 100 filaments are spun simultaneously, except that hot ammonia is blown onto the fibre during the spinning process in the drying tower.

The optimised range of conditions for spinning are a nozzle temperature of 190° C. and a spinning pressure of 2.5 MPa. At a drawing rate of 200 m/min, the diameter of the fibres is then about 18 µm in the non-pyrolysed fibre (gel fibre) and about 11 µm in the fibre pyrolysed at 1450° C. Fibres having lengths of between 40 km and 100 km are drawn continuously. No variation in the fibre diameter is observed during the spinning process when conditions are maintained constant. The fibres no longer melt and can be pyrolysed immediately up to 1500° C. In the course of this the individual filaments maintain their shape, but have a smooth surface and are not agglutinated to one another.

Example 4

Rendering the green fibre infusible 300 g of green fibres from Example 2 are introduced, on the roll, into a reactor under inert conditions. In addition 5 g of dichlorosilane is placed in the reactor, which is then heated to 40° C., so that the dichlorosilane can vaporise. The fibres are removed from the reactor after about 2 hours. After the subsequent pyrolysis in an atmosphere of nitrogen at up to 1500° C., the individual filaments have maintained their shape, possess a smooth surface and are not agglutinated to one another.

Example 5

Rendering the green fibre infusible 300 g of green fibres from Example 2 are introduced, on the roll, into a reactor under inert conditions. In addition 5 g of borane-dimethylamine complex is placed in the reactor, which is then heated to 120° C. The fibres are removed from the reactor after about 2 hours. After the subsequent pyrolysis in an atmosphere of nitrogen at up to 1500° C., the individual filaments have maintained their shape, possess a smooth surface and are not agglutinated to one another.

Example 6

Continuous pyrolysis of the green fibre

The cured green fibres (100 filaments) from Example 3 are drawn continuously at 10 m/h and under a tensile force of 0.3 N through the pyrolysis furnace.

The filaments, having been rendered ceramic, are drawn continuously through a size of polyvinyl alcohol and wound up. The diameter of the green fibre is 18 µm and the diameter of the fibre which has been rendered ceramic is 11 µm.

Physical data of the fibres rendered ceramic:
Composition in wt. %: Si: 33.9; B: 12.0; N: 39.5; C: 13.3; O: 0.8;

Tensile strength at room temperature: 3.3 GPa;

Tensile strength after exposure to air for 30 hours at 1400° C.: 2.7 GPa;

Modulus of elasticity: 390 GPa;

Creep resistance (standard BSR test, 1400° C., 1 h): m=0.58.

Example 7

Continuous pyrolysis of the green fibre

The cured green fibres (100 filaments) from Example 4 are drawn continuously at 10 m/h and under a tensile force of 0.4 N through the pyrolysis furnace.

The filaments, having been rendered ceramic, are drawn continuously through a size of polyvinyl alcohol and wound up. The diameter of the green fibre is 20 μm and the diameter of the fibre which has been rendered ceramic is 12 μm.

Physical data of the fibres rendered ceramic:

Composition in wt. %: Si: 34.5; B: 11.9; N: 39.0; C: 13.5; O: 0.9;

Tensile strength at room temperature: 3.0 GPa;

Tensile strength after exposure to air for 30 hours at 1400° C.: 2.5 GPa;

Modulus of elasticity: 360 GPa;

Creep resistance (standard BSR test, 1400° C., 1 h): m=0.54.

Example 8

Continuous pyrolysis of the green fibre

The cured green fibres (100 filaments) from Example 5 are drawn continuously at 10 m/h and under a tensile force of 0.4 N through the pyrolysis furnace.

The filaments, having been rendered ceramic, are drawn continuously through a size of polyvinyl alcohol and wound up. The diameter of the green fibre is 20 μm and the diameter of the fibre which has been rendered ceramic is 12 μm.

Physical data of the fibres rendered ceramic:

Composition in wt. %: Si: 34.2; B: 12.3; N: 39.3; C: 13.1; O: 0.7;

Tensile strength at room temperature: 3.1 GPa;

Tensile strength after exposure to air for 30 hours at 1400° C.: 2.6 GPa;

Modulus of elasticity: 380 GPa;

Creep resistance (standard BSR test, 1400° C., 1 h): m=0.55.

We claim:

1. Amorphous ceramic SiBNC fibres having a strength at room temperature of >2.5 GPa, and a creep value m of from 0.4 to 1, and wherein the fibres have an oxygen content of from 0.001 to 1.5 wt. %.

* * * * *